United States Patent [19]
Jensen

[11] Patent Number: 5,363,695
[45] Date of Patent: Nov. 15, 1994

[54] LEAK DETECTION SYSTEM AND METHOD FOR DETECTING AND MEASURING LIQUID LEAKS

[76] Inventor: Jeffrey C. Jensen, 22 King Arthurs Ct., Bridgewater, N.J. 08807

[21] Appl. No.: 963,197

[22] Filed: Oct. 19, 1992

[51] Int. Cl.⁵ .............................................. G01M 3/32
[52] U.S. Cl. ..................................... 73/49.2; 324/442; 324/448; 324/450; 73/304 C
[58] Field of Search ................ 73/49.2, 304 R, 304 C; 324/442, 446, 448, 449, 450

[56] References Cited

U.S. PATENT DOCUMENTS

| | | | |
|---|---|---|---|
| 3,695,108 | 10/1972 | Wygant | 73/304 C |
| 4,259,865 | 4/1981 | Myers | 73/304 C |
| 4,674,329 | 6/1987 | Mulder | 73/304 C |
| 4,736,622 | 4/1988 | Miller et al. | 73/49 |
| 4,736,623 | 4/1988 | Brown et al. | 73/49 |
| 4,780,663 | 10/1988 | Mulder | 324/446 |
| 4,813,269 | 3/1989 | Brown et al. | 73/49 |
| 4,813,284 | 3/1989 | Miller et al. | 73/49 |
| 4,813,285 | 3/1989 | Brown et al. | 73/49 |

Primary Examiner—Hezron E. Williams
Assistant Examiner—Michael Brock
Attorney, Agent, or Firm—Kenyon & Kenyon

[57] ABSTRACT

A system and method for detecting leaks in a storage tank that includes a stored tank liquid and an immiscible test liquid, and there is an interface formed between the tank liquid and the test liquid. The system includes a transducer and electronic device. The transducer further includes a measuring cell and a standard cell. The level of the interface within the standard cell does not change when the level of the interface changes. The level of the interface within the measuring cell changes according to the level of test liquid in the storage tank. The signal generated by the cells are processed by the electronic device to indicate whether there is leakage in the storage tank.

22 Claims, 10 Drawing Sheets

TANK LEAK DETECTOR

CONDUCTIVITY TRANSDUCER

ASSEMBLY (SECTION SKETCH)

CONDUCTIVITY TRANSDUCER ASSEMBLY (SECTION SKETCH)

TANK LEAK DETECTOR DIFFERENTIAL PRESSURE PHYSICS

WATER DENSITY = DW    TANK LIQUID DENSITY = DTL

PRESSURE HEADS:

TANK BEFORE LEAK

$$(H1)(DTL) + (H2)(DW) = (H3)(DTL) + (H4)(DW)$$

TANK AFTER LEAK

$$(H1)(DTL) + (H2-\Delta H)(DW) \neq (H3-\Delta H)(DTL) + (H4)(DW)$$

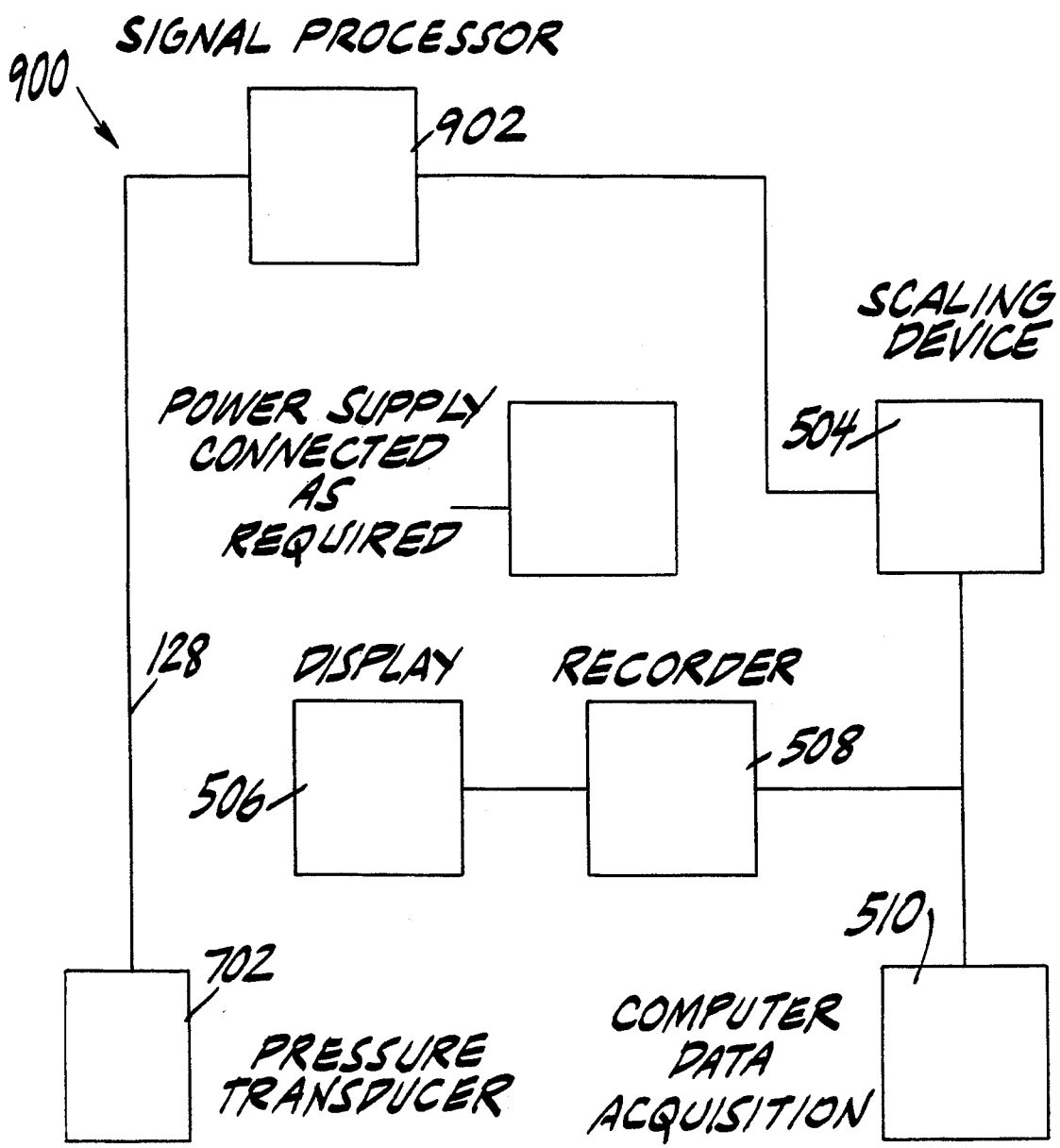

LEAK DETECTION SYSTEM AND METHOD FOR DETECTING AND MEASURING LIQUID LEAKS

FIELD OF THE INVENTION

The present invention relates to a leak detection system and method for detecting and measuring liquid leaks in storage tanks. More specifically, the present invention is directed to a leak detection system and method for detecting and measuring liquid leaks in storage tanks without the need to modify the storage tanks.

BACKGROUND OF THE INVENTION

Both large and small storage tanks have been used for containing a variety of liquids. Some of these liquids, such as water, if leaked from a storage tank would have no detrimental effect on the environment, while others, such as hydrocarbon based fuels, could have a very harmful effect.

Concerns regarding the potentially hazardous effects certain liquids may have on the environment and on people exposed to the liquids have made the early detection of leaks from storage tanks increasingly important. In addition, the early and accurate detection of storage tank leaks allows the loss of valuable liquids to be minimized.

In many cases, leaks in storage tanks are not visually identifiable. For example, there could be a leak from the bottom of the tank. Moreover, liquids leaking from storage tanks are quickly absorbed into the ground, thereby providing little visual evidence of the leak. Therefore, only very large leaks are detectable by visual inspection of the area surrounding the tanks or the tanks themselves.

Visual detection of leaks by inspection of the change in the liquid level of the storage tank is also extremely difficult. This is particularly true in the case of large diameter storage tanks. A problem associated with large diameter storage tanks is that even small leaks, which are visually imperceptible, translate into large volume losses of the tank liquid. As such, before a leak is visually detectable, significant liquid loss and/or significant environmental damage may be experienced.

Additional problems associated with visually inspecting the liquid level in tanks to determine if there is leakage is that inaccuracies are introduced by physical factors that affect the tank liquid. For example, the volume may change due to temperature variations or the motion of the liquid due to the wind.

In the past, a method of detecting leaks in storage tanks has involved filling a tank with water, or other liquid, to a high level to subject the tank bottom to as great a pressure as possible. A sight glass was provided to permit visual inspection the level of water or liquid in the tank.

Another method has been to add water to tanks containing a stored liquid in order to limit the harmful effects of a leak in the tank. Since water has a greater specific density than the liquids usually stored in the storage tanks and is immiscible with most of these liquids, the water settles to the bottom of the tank and an interface is formed between the water and the stored liquid. Thus, in the case of a bottom leak, no tank liquid would leak from the tank until all of the water had leaked out. A sight glass may be used to inspect the level of the interface between the water and the stored liquid.

Detection of tank leaks by using either of these methods is limited by sight glass meniscus resolution. For example, if the sight glass meniscus resolution is limited to approximately a 1/16 inch variation in liquid level, there can be significant liquid losses before leakage is detected, as shown in Table 1.

TABLE 1

| VERTICAL CYLINDRICAL TANKS | | |
|---|---|---|
| TANK DIAMETER (FEET) | VOL/FT. DEPTH (GALLONS) | VOL/1/16" DEPTH (GALLONS) |
| 10 | 587.6 | 3.06 |
| 25 | 3672.2 | 19.125 |
| 50 | 14688.9 | 76.505 |
| 75 | 33050.0 | 172.135 |
| 100 | 58755.6 | 306.02 |
| 125 | 91805.7 | 478.155 |
| 150 | 132200.2 | 688.54 |
| 175 | 179939.1 | 937.18 |
| 200 | 235022.5 | 1224.075 |

Moreover, most sight glasses, even when filled with liquid, are of small mass, and the level in sight glasses is greatly affected by the wind. The level of the liquid in the sight glass also is significantly affected by temperature changes.

In the past, leaks have also been detected using a differential pressure transducer that connects to the liquid volume inside the tank through a pipe extending from the base of the tank. One side of the pressure transducer is connected to the storage tank through a pipe and a valve, and the other side of the pressure transducer is connected to an external standpipe. The transducer compares the liquid level in the tank to the level of liquid in the standpipe. Leaks, therefore, are detected by changes in the differential pressure at the pressure transducer.

The differential pressure transducer method reduces some of the inaccuracies associated with the thermal expansion and contraction of the liquid due to temperature. However, the thermal expansion and contraction of the piping that connects this system to the tank, standpipe, and within the standpipe itself is significant. This may cause pressure variations of the same magnitude as would be caused by small leaks. Thus, this method is ineffective to detect such small leaks. In addition, this method is practical only for above-ground tanks because the cost of modifying underground or partly in-ground tanks is prohibitive, and because most underground tanks are not of an uniform cross-sectional area at different elevations in the tank.

Even the installation of such systems on above-ground tanks requires substantial modifications to the tank. For example, the tank may need to be emptied, purged of hydrocarbon vapors, and holes must be put in the tank in order to connect the standpipe and differential transducer to the tank.

In the alternative, the tanks may be hot tapped. This requires the welding of a pipe to the outside wall of the tank and then drilling a hole through the tank wall. There is the risk that the heat generated during this operation may ignite the liquid stored in the tank or that this operation will structurally damage the tank itself.

In addition, these types of systems are subject to inaccuracies caused by any floating roof which is in contact with the stored liquid. This is due to random pressure changes which may result from the movement of the roof.

Accordingly, there is a need for a leak detection system for rapidly detecting leaks in storage tanks that does not suffer from the problems associated with prior systems.

SUMMARY OF THE INVENTION

The present invention is directed to a leak detection system for rapidly detecting liquid leaks in a storage tank without the need to make modifications to the storage tank.

In order to practice the present invention, a test liquid, which is immiscible with the liquid stored in the tank, is added to a storage tank. That is, a specific amount of the immiscible test liquid, for example, water, fills the bottom of the tank to a predetermined level. The test liquid is chosen to have a specific gravity that is greater than that of the tank liquid so that when it is added to the tank the test liquid sinks to the bottom and on it floats the tank liquid. Since the test liquid is immiscible with the tank liquid, an interface is formed between the two liquids.

The leak detection system of the present invention includes a transducer for generating signals indicative of the height of the interface with respect to an initial position, and detection circuitry for processing the signals output from the transducer into signals that are usable by displays, recording devices, and computing devices.

The transducer is lowered into the tank and rests on the bottom. The transducer has a standard cell and a measuring cell. The measuring cell measures the height of the interface in the storage tank. The height of the interface in the standard cell always remains the same and does not change with the height of the interface in the tank when there is leakage. Therefore, if there is a leak, the level of the interface within the measuring cell will change while the level in the standard cell will not.

The measuring cell generates a signal based on the height of the interface within it and the tank. The standard cell provides a base line signal to which the signal from the measuring cell is compared.

The detection circuitry includes a detector, scaling device, display, recorder, and computer. A change in the level of the interface in the measuring cell is detected by the detector which receives and compares the signals output from the two cells of the transducer. The scaling device amplifies or attenuates the signal output by the detector and provides an output for the display, recorder, and computer. The detection circuitry processes these signals.

The computer may be used to control the system of the present invention, but is preferably used for data analysis and manipulation such as the calculation of the volumetric liquid leak rate. Alternatively or additionally, the computer may perform desired mathematical signal analysis, graphic display, disk data storage, modem data transfer, report printing, or any other function within its capabilities.

BRIEF DESCRIPTION OF THE DRAWINGS

FIG. 10 is a block diagram of the detection system according to the third embodiment of the present invention.

DETAILED DESCRIPTION OF THE INVENTION

The present invention is a leak detection system for detecting leaks in storage tanks without requiring modifications to the tank.

Figure 1:
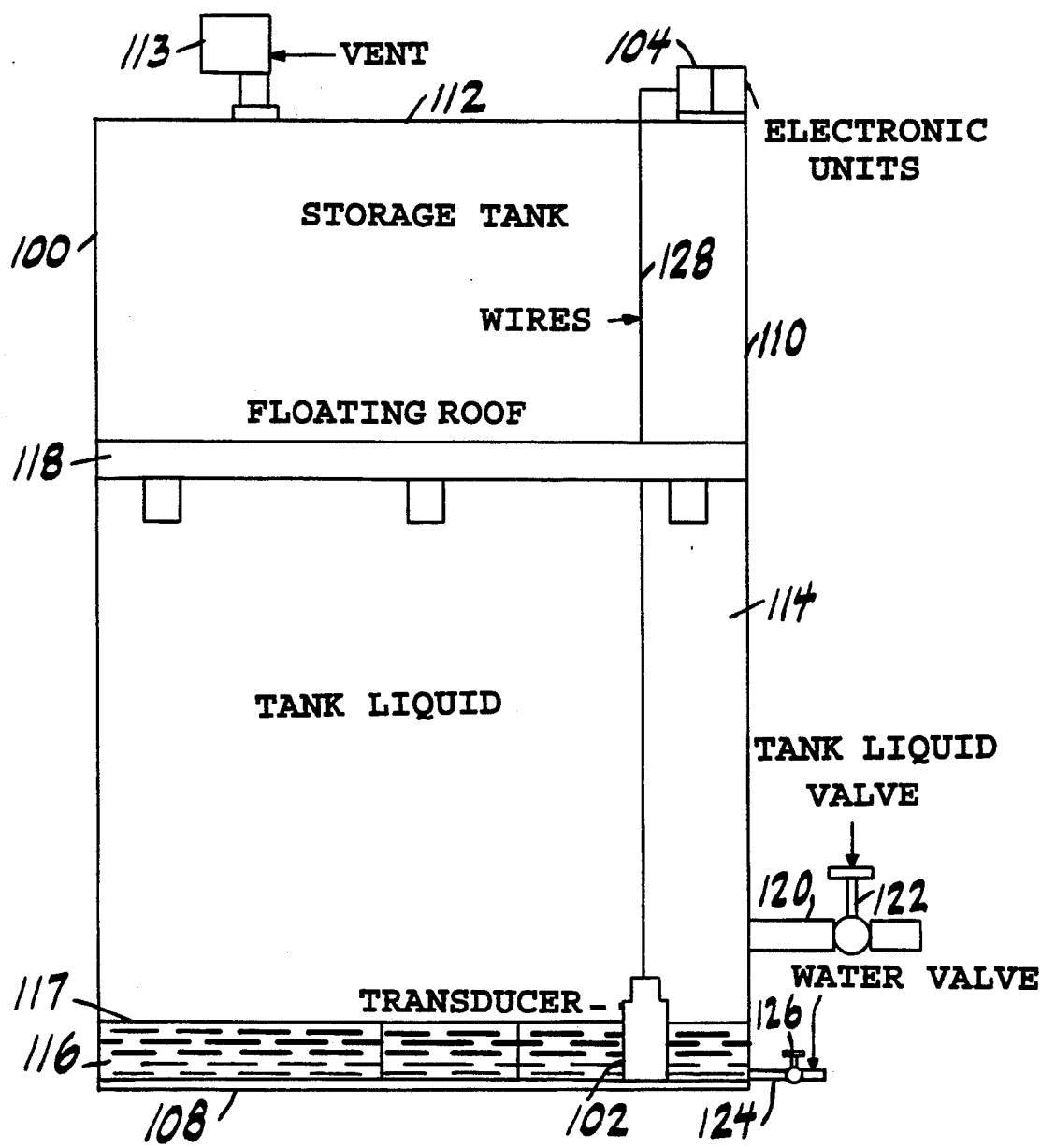
FIG. 1 shows a cross-sectional view of a storage tank with the leak detection system of the present invention disposed thereon and therein.

Referring to FIG. 1, the system of the present invention is shown disposed on and within storage tank 100. Storage tank 100 is a representative storage tank to which the system of the present invention may be used to detect leakage therefrom. Storage tank 100 includes base or bottom 108, sides 110, and top 112. In many instances, the tank does not have top 112, but only has floating roof 118.

Top 112 may include a vent, such as vent 113, for venting the tank as necessary. The vent also permits the equalization of the pressure within the tank.

Storage tank 100 contains tank liquid 114, which may be a hydrocarbon based fuel, such as diesel fuel, aviation gasoline, or gasoline. Test liquid 116 is also added to the tank. Preferably, the test liquid that is selected has a specific gravity that is greater than the specific gravity of tank liquid, and it is immiscible with respect to tank liquid. These two conditions result in a clearly defined interface 117 being formed between the two liquids.

In many cases, floating roof 118 is disposed on top of tank liquid 114. The floating roof reduces the evaporation of tank liquid 114, and prevents foreign matter from contaminating the tank liquid. Floating roof 118 also increases the pressure in tank liquid 114 and test liquid 116.

Tank liquid 114 is removed from the tank 100 through pipe 120, which has a tank liquid valve 122 disposed therein, and test liquid 116 is removed through a pipe 124, which has test liquid valve 126 disposed therein. With the positioning of pipes 120 and 124 shown in FIG. 1, tank liquid 114 and test liquid 116 may be added or removed independently. Both pipes 120 and 124, along with valves 122 and 126, are standard equipment on storage tanks.

The leak detection system of the present invention includes transducer 102 and electronic device 104.

These two elements of the system are connected by cable assembly 128. The cable assembly, or other means that may be connected to transducer 102, may be used to lower transducer 102 to the bottom of storage tank 100, as shown in FIG. 1. Cable assembly 128 is also used for transmitting signals from the electronic device 104 to the transducer, and transmitting signals from the transducer to the electronic device 104.

Electronic device 104 may include devices that display or record information based on signals output by transducer 102. The electronic device 104 may also include a microprocessor or computer which may be used to control the system of the present invention and manipulate the data received from other devices of electronic device 104. Further, electronic device 104 may be connected to an alarm that indicates an alarm condition if the difference between the signals output from the transducer is greater than a predetermined threshold value.

Figure 2:
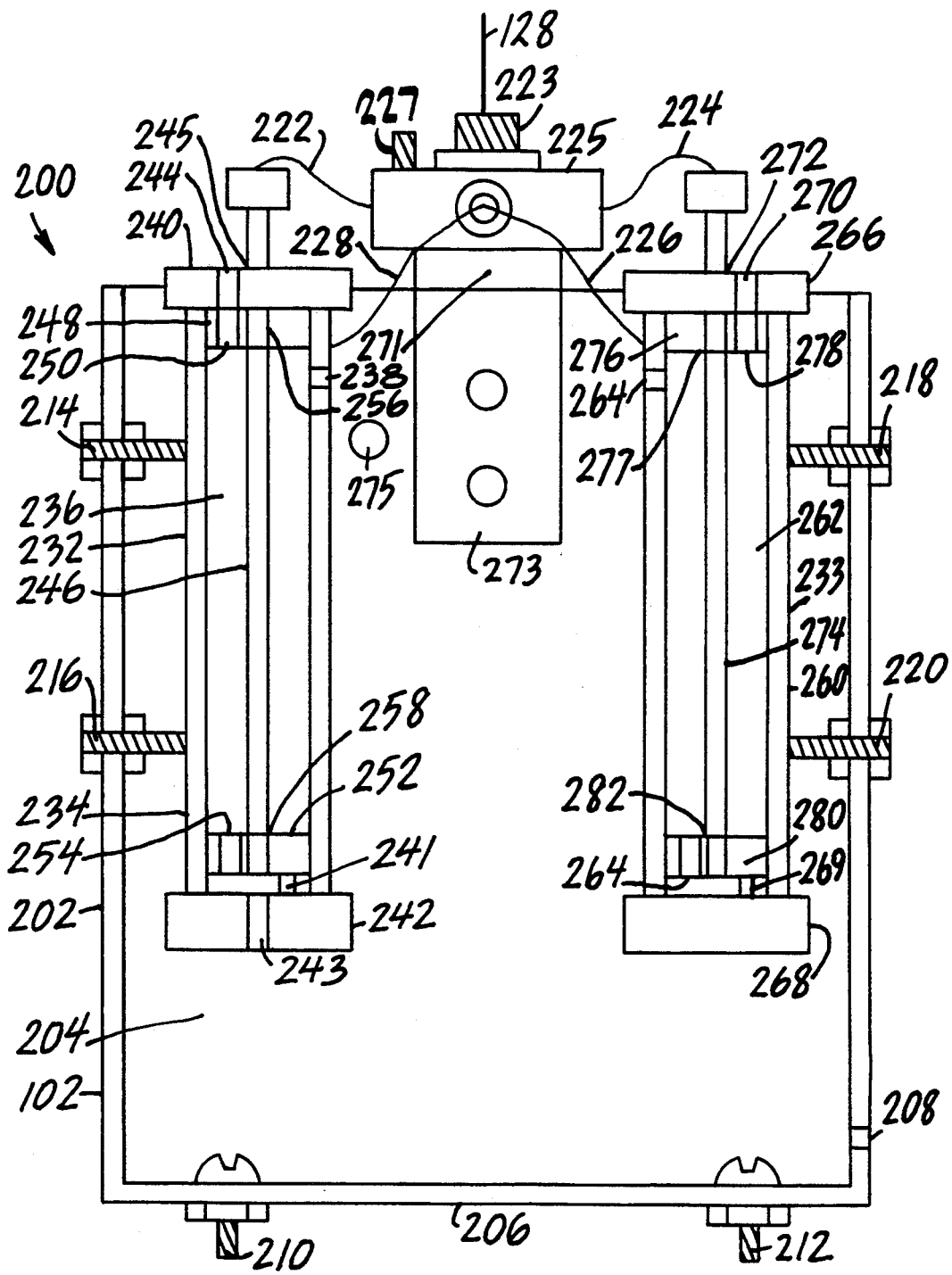
FIG. 2 is a cross-sectional view of the preferred embodiment of the transducer of the leak detection system of the present invention.

Referring to FIG. 2, a first embodiment of transducer 102 of the present invention is shown generally at 200. The transducer at 200 includes outer cylindrical wall 202 and circular bottom 206, which define an open top inner cylindrical chamber 204.

Hole 208 is positioned in outer cylindrical wall 202 below the level of the interface between the test and tank liquids. This permits liquid to flow into, and out of, inner chamber 204 when the transducer is disposed at the bottom of storage tank 100. Hole 208 alternatively may be formed in circular bottom 206.

Bottom 108 of storage tank 100 is likely to contain debris. As such, positioning hole 208 on the side in outer cylindrical wall 202 moves hole 208 further from tank bottom 108 and such debris. However, whether hole 208 is positioned in outer cylindrical wall 202 or circular bottom 206, this hole is of a size to prevent debris from passing through it.

Circular bottom 206 has a plurality of stand-off screws disposed therethrough of which representative screws 210 and 212 are shown. Screws 210 and 212 contact the bottom 108 of the tank 100 and support the transducer 102 thereon. Since only the ends of screws 210 and 212 contact the bottom of tank 100, there is only a small area that supports transducer 102. Screws 210 and 212 may also be of a smaller diameter or pointed to further decrease the contact area. This permits the transducer to have better contact with bottom 108 of tank 100 through any debris that is there. This reduces the chances of the transducer making inaccurate measurements.

Mounting screws 214 and 216 are fixed to the electrical conductivity cell 232. Similarly, screws 218 and 220 are fixed to the electrical conductivity cell 233. These screws are disposed and sealed through cylinder wall 202.

Electrical conductivity cell 232 includes cylindrical wall 234, top cap 240, and bottom cap 242, which define cell chamber 236. Cylindrical wall 234 is electrically conductive and is electrically coupled to electronic device 104 through wire 228, cable junction box 225, cable connector 223, and cable assembly 128.

Cylindrical wall 234 forms one of the two electrodes of conductivity cell 232. Cylindrical wall 234 includes a plurality of holes located below insulative spacer 248 of which hole 238 is representative. Holes 238 permit the flow of liquid between cell chamber 236 and inner cylindrical chamber 204.

Top cap 240, which is disposed at the top end of cylindrical wall 234 and is non-conductive, has hole 244 extending through it and hole 245 for receiving pole electrode 246. Hole 244 permits liquid to flow between storage tank 100 and cell chamber 236.

Bottom cap 242 is disposed at the bottom of cylindrical wall 234 and is non-conductive. This cap has hole 243 extending through it. This hole allows liquid to pass between cell chamber 236 and inner cylindrical chamber 204.

Insulative spacer 248 is disposed at the top end of cylindrical wall 234 just below top cap 240. Insulative spacer 248 has hole 250 therethrough which is aligned with hole 244 in top cap 240. These aligned holes allow liquid to pass between the tank and cell chamber 236. The aligned holes also allow trapped air to escape from cell chamber 236.

Insulative spacer 252 is disposed in cylindrical wall 234 positioned by standoff pin 241 to be spaced above bottom cap 242. Spacer 252 has hole 254 through it. Holes 254 and 243 allow liquid to pass between cell chamber 236 to inner cylindrical chamber 204 and also allow any trapped air to escape.

Insulative spacers 248 and 252 also include holes 256 and 258, respectively, for receiving and properly positioning pole electrode 246 within cylindrical wall 234. Pole electrode 246 is made from an electrically conductive material and connects to electronic device 104 through wire 222, cable junction box 225, cable connector 223, and cable assembly 128. Pole electrode 246 is the second electrode for conductivity cell 232.

The second electrical conductivity cell, cell 233, includes cylindrical wall 260, top cap 266, and bottom cap 268, which define cell chamber 262. Cylindrical wall 260 is electrically conductive, and is electrically coupled to electronic device 104 through wire 226, cable junction box 225, cable connector 223, and cable assembly 128. Cylindrical wall 260 forms one of the two electrodes of conductivity cell 233.

Cylindrical wall 260 includes a plurality of holes just below insulative spacer 276 of which hole 264 is representative. Holes 264 permit the flow of liquid between cell chamber 262 and inner cylindrical cell chamber 204.

Top cap 266, which is disposed at the top end of cylindrical wall 260 and is non-conductive, has hole 270 extending through it and hole 272 for receiving pole electrode 274. Hole 270 permits liquid to flow between storage tank 100 and cell chamber 262.

Bottom cap 268 is disposed at the bottom of cylindrical wall 260 and is non-conductive. This cap seals the bottom end of cylindrical wall 260.

Insulative spacer 276 is disposed at the top end of cylindrical wall 260 just below top cap 266. Spacer 276 has hole 278, which is aligned with hole 270 of top cap 266. These aligned holes allow liquid to pass between storage tank 100 and cell chamber 262. The aligned holes also will allow trapped air to escape from within cell chamber 262.

Insulative spacer 280 is disposed at the bottom end of cylindrical wall 260 positioned by standoff pin 269 to be spaced above bottom cap 268. Hole 264 allows any air trapped under spacer 280 to escape.

Insulative spacers 276 and 280 have holes 277 and 282, respectively, for receiving and properly positioning pole electrode 274 within cylindrical wall 260. Pole electrode 274 is made from an electrically conductive material and connects to electronic device 104 through wire 224, cable junction box 225, cable connector 223, and cable assembly 128. Pole electrode 274 is the second electrode of conductivity cell 233.

Threaded screw 227 is used to connect a safety chain between cable assembly 128 and cable junction box 225. This will allow the transducer to be retrieved from the tank if the cable connector 223 loosens or breaks.

Support bar 271 bridges the top of cylinder walls 202. There are two support brackets 273 fixed to the ends of support bar 271 and also fixed to the inside of cylinder wall 202. Cable junction box 225 is fixed to the top, middle of bar 271.

Hole 275 is one of a plurality of limit overflow holes in cylinder wall 202 positioned below cylindrical wall hole 264 in conductivity cell 233. These overflow holes prevent inner cylindrical chamber 204 from being overfilled to the level of cylindrical wall hole 264 of conductivity cell 233 when water is added to cylinder chamber 204 before lowering transducer 200 into the storage tank 100. The water height in chamber 262 of conductivity cell 233 is set to be at the level of tank water 116 before the transducer is disposed in the tank and additional water must be prevented from flowing into cell chamber 262 through cylindrical wall hole 264 once the transducer is disposed in the tank.

Figure 3:
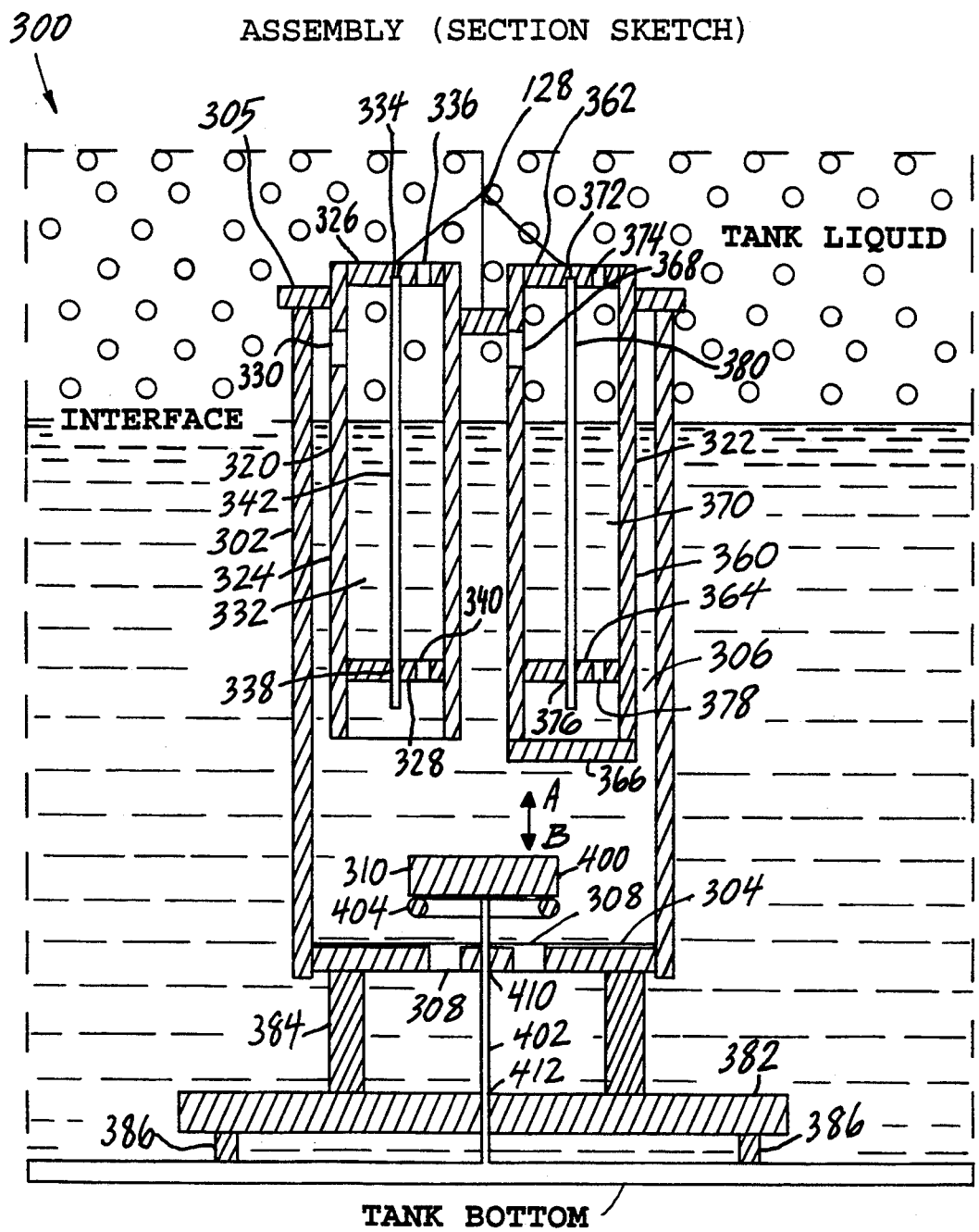
FIG. 3 is a cross-sectional view of a second embodiment of the transducer of the leak detection system of the present invention.

Referring to FIG. 3, the second embodiment of the transducer of the leak detection system of the present invention is shown generally at 300. The second embodiment of the transducer shown at 300 is similar to the first embodiment, with the principal difference being the method by which liquid flow is controlled at lower end member 304.

The transducer shown at 300 has outer cylindrical wall 302 which is mounted on lower end member 304. Top end member 305 is disposed at the top of cylindrical wall 302. The top end member, bottom end member, and cylindrical wall define inner cylindrical chamber 306.

Lower end member 304 includes a plurality of holes of which holes 308 are representative. Holes 308 permit liquid to flow between inner cylindrical chamber 306 and storage tank 100 when a valve assembly 310 is in an open position.

Like the first embodiment of transducer 102 shown at 200 in FIG. 2, the transducer at 300 has two electrical conductivity cells, cells 320 and 322. Conductivity cell 320 has cylindrical wall 324 with insulative spacer 326 disposed at the top and insulative spacer 328 disposed within it near the bottom opening. Cylindrical wall 324 is electrically conductive and is one of the two electrodes of conductivity cell 320.

Cylindrical wall 324 connects to electronic device 104 via cable assembly 128. Cylindrical wall 324 has at least one hole 330 extending through it near the top. Hole 330 is for passing liquid between cell chamber 332 and inner cylindrical chamber 306. It is understood that there may be a plurality of holes 330 in cylindrical wall 324.

Insulative spacer 326 has holes 334 and 336 disposed therethrough. Hole 336 is for permitting liquid to flow between storage tank 100 and cell chamber 332. Insulative spacer 328 has holes 338 and 340 through it. Hole 340 is for permitting the flow of liquid between cell chamber 332 and inner cylindrical chamber 306. Hole 334 in spacer 326 and hole 338 in spacer 328 receive and properly position pole electrode 342 within cylindrical wall 324. Pole electrode 342 is made from an electrically conductive material and connects to electronic device 104 via cable assembly 128. Pole electrode 342 is the second electrode of conductivity cell 320.

Conductivity cell 322 has cylindrical wall 360 with insulative spacer 362 disposed at the top, insulative spacer 364 disposed within cylindrical wall 360 near the bottom, and bottom seal 366, which closes the bottom of the cylindrical wall. Cylindrical wall 360 is electrically conductive and forms one of the two electrodes of conductivity cell 322. Cylindrical wall 360 is connected to electronic device 104 by cable assembly 128.

Cylindrical wall 360 also has hole 368 therethrough. Hole 368 is for passing liquid between cell chamber 370 and inner cylindrical chamber 306. It is understood that there may be more than one hole 368 in cylindrical wall 360.

Insulative spacer 362 has holes 372 and 374. Hole 374 is for allowing liquid to flow between storage tank 100 and cell chamber 370. Insulative spacer 364 has holes 376 and 378 extending therethrough. Hole 372 in spacer 362 and hole 376 in spacer 364 receive and properly position pole electrode 380 within cylindrical wall 360. Pole electrode 380 is made from an electrically conductive material and connects to electronic device 104 by cable assembly 128. Pole electrode 380 is the second electrode of conductivity cell 322.

Lower end member 304 is coupled to base plate 382 by a plurality of support members 384. Base plate 382 has a plurality of feet 386 which support the transducer shown at 300 above bottom 108 of storage tank 100.

Valve assembly 310 includes disc member 400 which is mounted on valve stem 402. O-ring 404 is fixed to the lower surface of disc member 400. When the valve assembly is in a closed position, O-ring 404 extends over and seals holes 308.

Valve stem 402 extends downward through hole 410 in lower member 304 and hole 412 in base plate 382. The valve stem slideably engages these holes such that the valve assembly may move in directions "A" and "B," shown in FIG. 3.

When the transducer at 300 is suspended in the air or in tank 100, the weight of disc member 400 forces valve stem 402 in direction "B" thereby moving the valve assembly into the closed position. Upon lowering the transducer to the bottom of storage tank 100, valve stem 402 is the first thing to contact the bottom. When the valve stem 402 contacts bottom 108, the valve assembly 310 is moved in direction "A" relative to the remainder of the transducer. This opens the valve assembly, and disc member 400 and O-ring 404 are lifted out of a sealing engagement with lower end member 304. When the valve assembly is in the open position, there may be liquid flow between inner cylindrical chamber 306 and storage tank 100.

Figure 4:
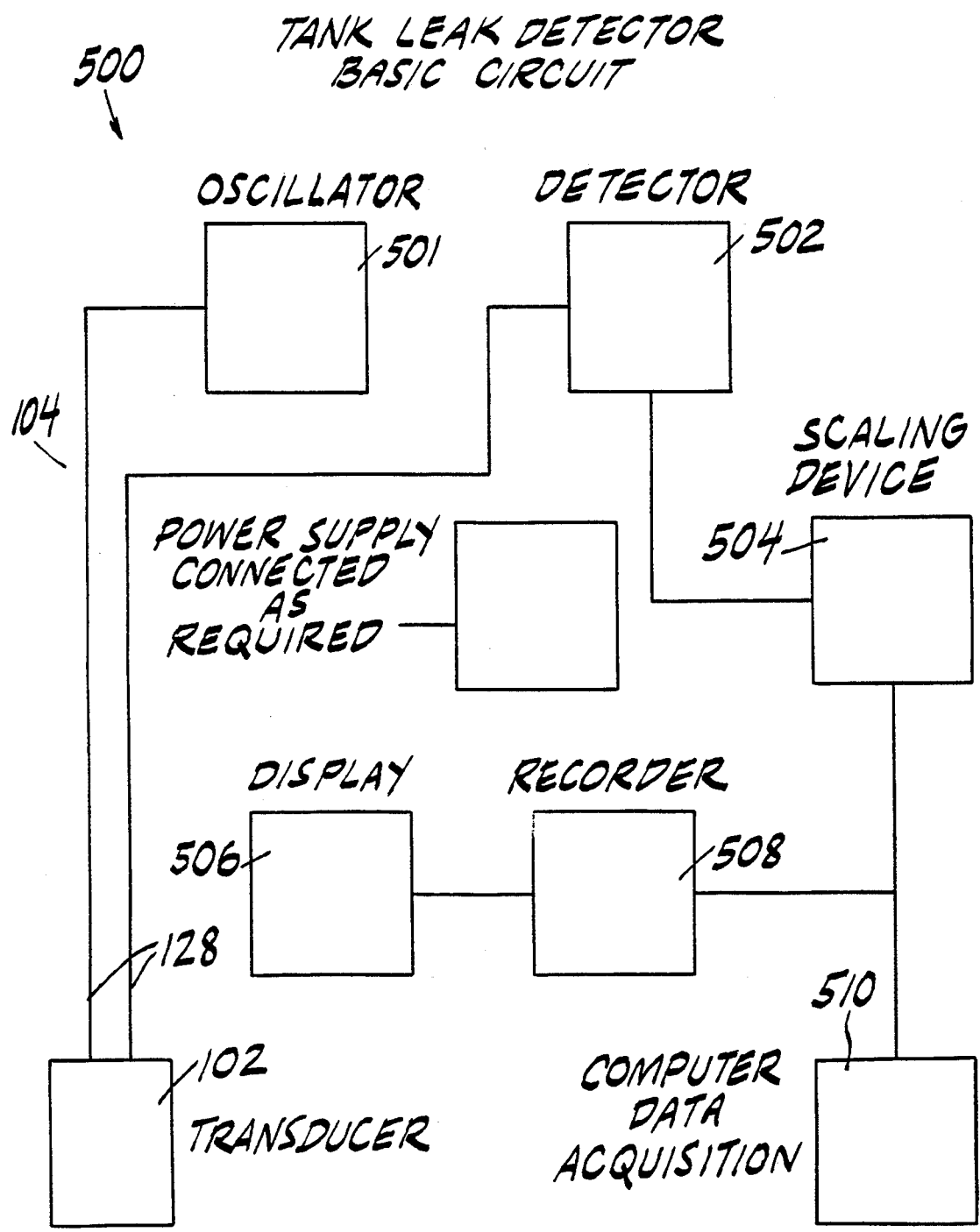
FIG. 4 is a block diagram of electronic device 104 of the leak detection system according to the first and second embodiments of the present invention.
Figure 5:
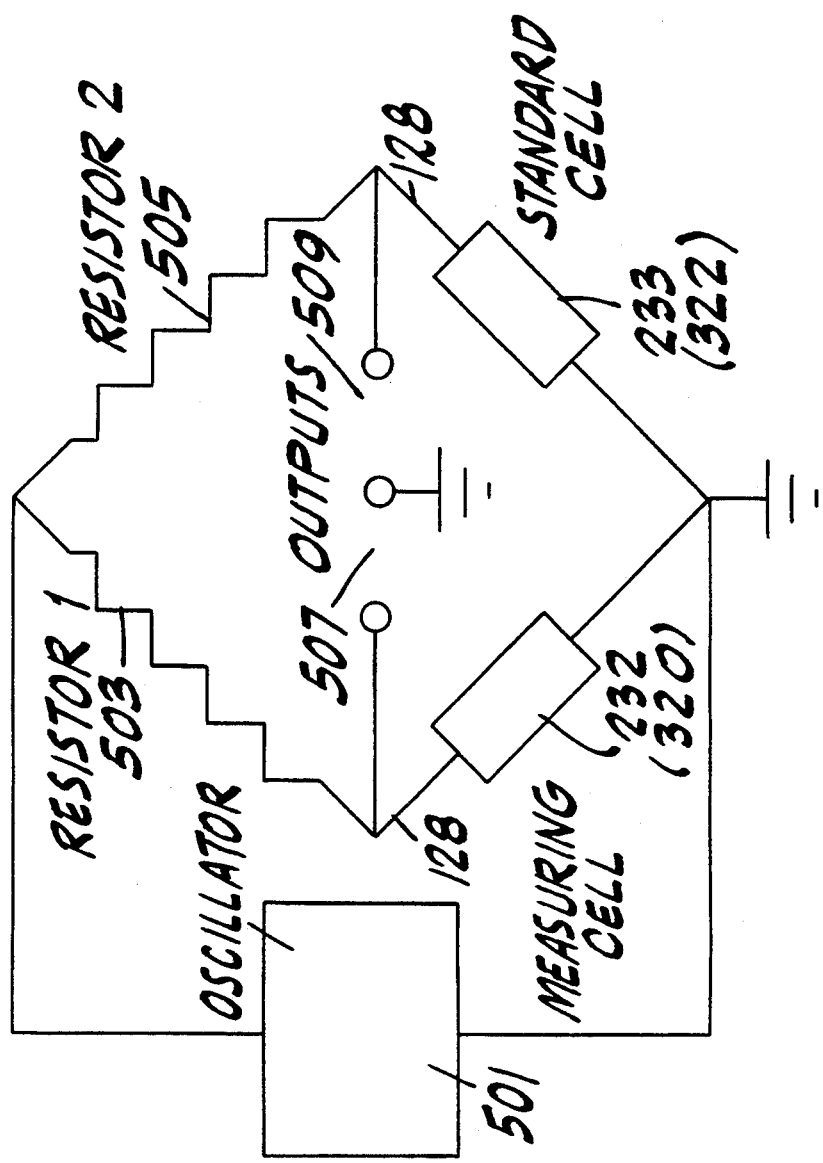
FIG. 5 is a schematic diagram of the transducer signal detection circuit according to the first and second embodiments of the present invention.

Referring to FIG. 4, a block diagram of electronic device 104 of the leak detection system of the present invention is shown generally at 500. Electronic device 104 may include oscillator 501, detector 502, scaling device 504, display 506, recorder 508, and computer 510. It is to be understood that one or more of the components of electronic device 104 may be positioned at a location remote from the storage tank and still be within the scope of the present invention. All or any number of the components of electronic device 104 may be separate devices that are connected together to perform the function of electronic device 104.

Oscillator 501 provides excitation for the transducer. While an A.C. signal is preferred for this purpose to prevent possible electrode plating effects, a D.C. or pulsed signal can also be used.

Detector 502 receives the signals output from the two conductivity cells of transducer 102. Detector 502 processes these signals to determine if there is a difference between them. This difference is indicative of a leak condition.

Scaling device 504 processes the signal output from detector 502 so that these signals may be properly amplified or attenuated.

The output of scaling device 504 is input to display 506, recorder 508, and computer 510. Display 506 may be a device that provides a visual display of what the scaled signal represents. Recorder 508 may be a continuous recorder that monitors the signals output from scaling device 504. Computer 510 has the capability to perform any desired analysis of the signals that it receives from scaling device 504 or any type of data manipulation within the capabilities to these signals.

Computer 510 also may be a microprocessor, a conventional personal computer, or in situations where more advanced data manipulation and analysis or greater system control are desired, it may be a work station that connects to electronic device 104. It is also to be understood that computer 510 may be connected to a number of electronic devices 104.

Figure 6:
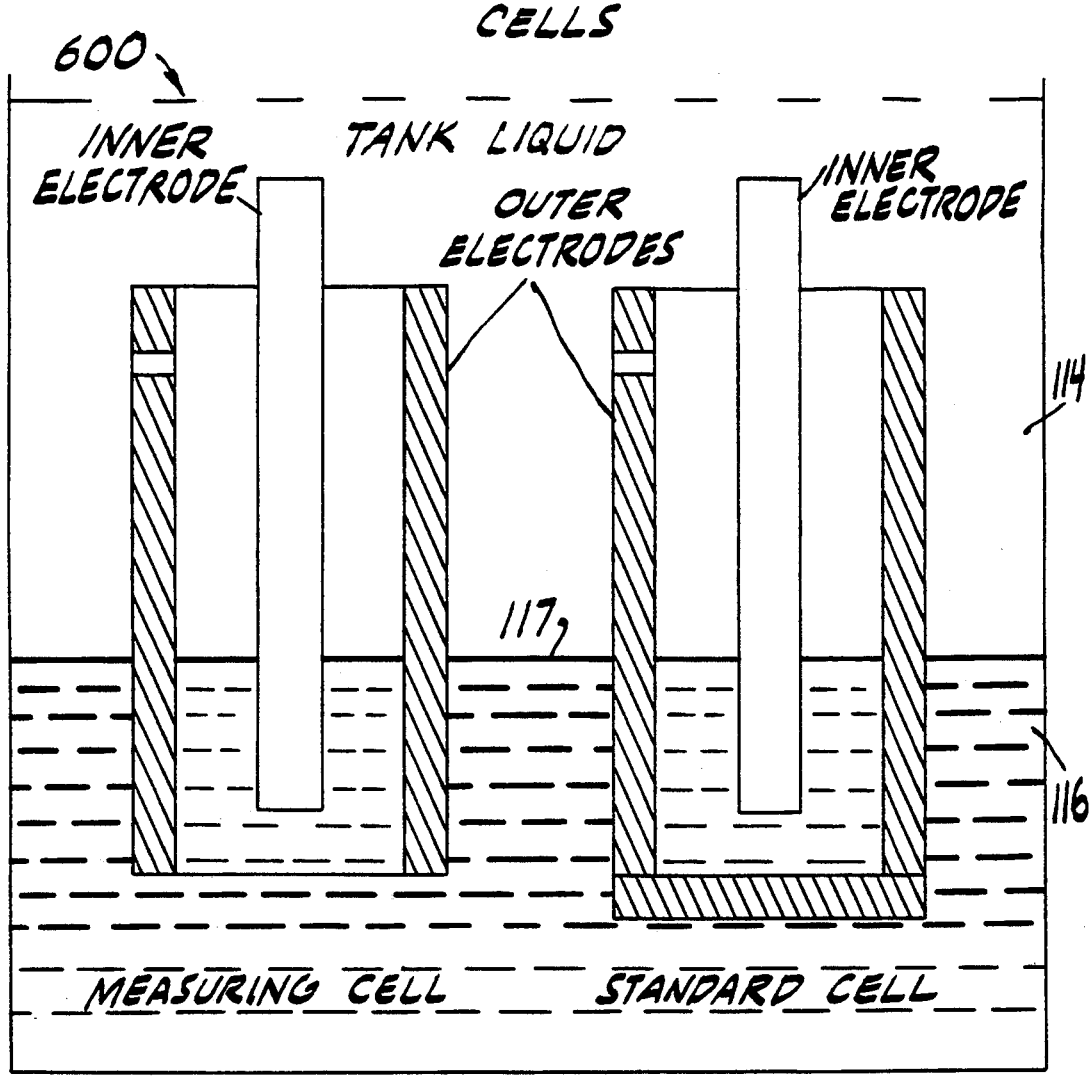
FIG. 6 is a cross-sectional view of a transducer representative of the first or second embodiment of the transducer of the leak detection system of the present invention before a leak in the storage tank.
Figure 7:
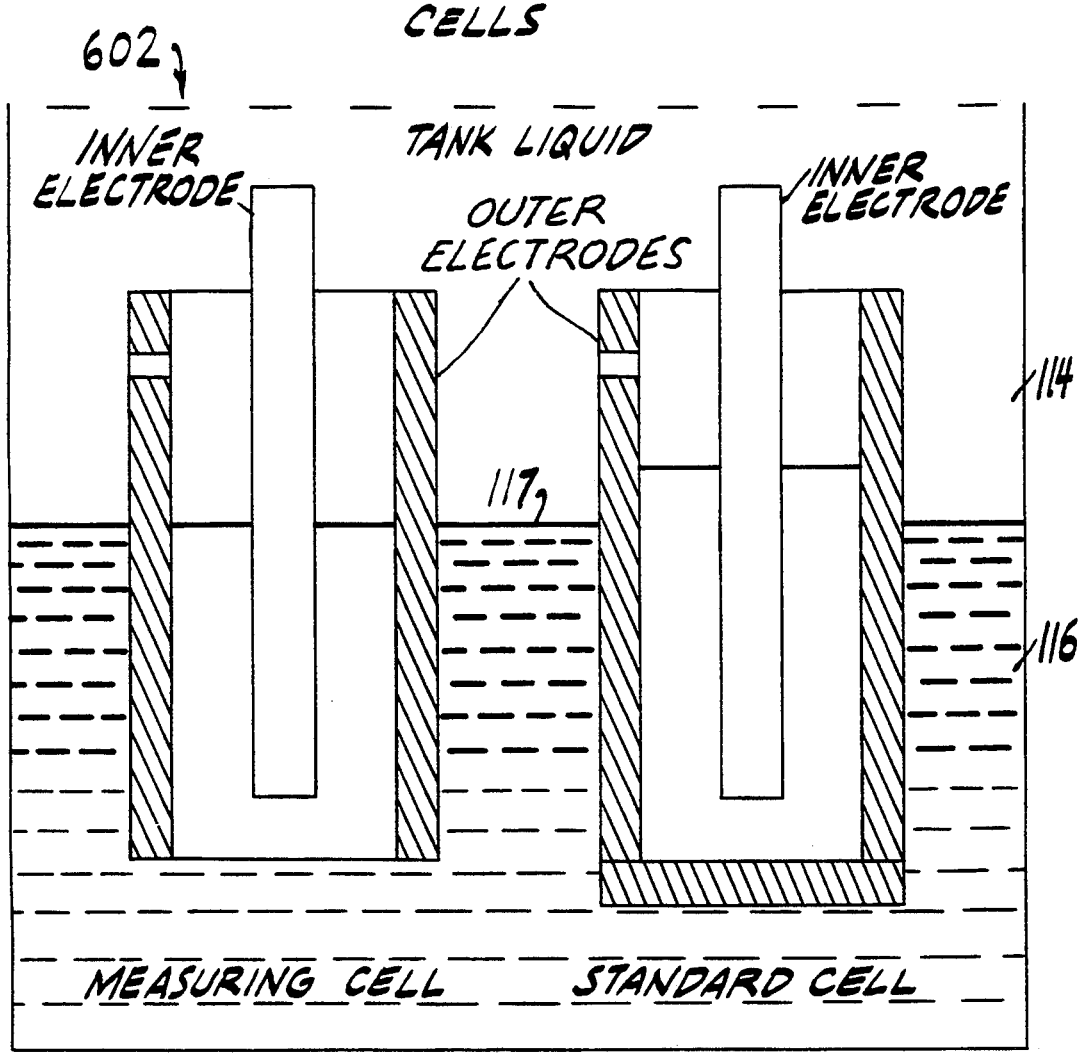
FIG. 7 is a cross-sectional view of a transducer representative of the first or second embodiment of the transducer of the present invention after a leak in the storage tank.

Referring to FIGS. 1, 6, and 7, operation of the first and second embodiments of transducers 102, which are shown in FIG. 2 at 200 and FIG. 3 at 300, respectively, will be described.

To use the present invention, test liquid 116 is added to the storage tank 100 to a height of approximately 6 inches from tank bottom 108, as shown in FIG. 1. The test liquid has a specific gravity greater than that of tank liquid 114 and is immiscible with regard to tank liquid 114. As such, test liquid 116 sinks to the bottom and interface 117 is formed between test liquid 116 and tank liquid 114 (which floats on test liquid 116).

Since the first and second embodiments of the transducer of the present invention operate substantially the same, the first embodiment will be described and the corresponding reference members, if applicable, for the second embodiment will follow in parenthesis.

The height of test liquid 116 is usually chosen so that interface 117 is approximately 6 inches from bottom 108 of tank 100. Before transducer 102, according to the first embodiment (second embodiment), is lowered into the tank, inner cylindrical chamber 204 (306) and electrical conductivity cell 232 (320) are filled with test liquid to a height such that the liquid is about ¼ inch below holes 238 and 264 (330 and 368). The closed bottom electrical conductivity cell 233 (322) is filled with test liquid to the height, from the lowest ends of screws 210 and 212 (386), equal to the tank test liquid 116 height.

As transducer 102 is lowered to the bottom of storage tank 100, the air above the test liquid in the cells 232 and 233 (320 and 322) escapes through holes 244 and 250 (336) in top cap 240 and spacer 248 (326), respectively, and holes 270 and 278 (374) in top cap 266 and spacer 276 (362), respectively. In addition, hole 208 in the lower portion of outer cylindrical wall 202 is small enough to allow only a small quantity of test liquid to escape the inner chamber 204 as the transducer is lowered. For example, hole 208 may be ⅛′ diameter.

Once on tank bottom 108, sufficient test liquid will flow out of hole 208 (308) to have the test liquid level in transducer 102 equal to tank test liquid level 116. After equalization, the level of test liquid in open-bottomed conductivity cell 232 (320) and bottom of the tank is near the level in closed-bottomed conductivity cell 233 (322). If, however, there is a difference in the levels, detector 502 must be used to make adjustments to "zero" the difference between the levels in the two cells electrically so that leak measurements will be within the operating range of the detector.

Referring now to FIGS. 1, 5, 6, and 7, when transducer 102 is in place at bottom 108 of tank 100, oscillator 501 transmits the transducer excitation signals via cable assembly 128 to the transducer. Oscillator 501 includes two resistive arms resistor-1 503 and resistor-2 505, which form voltage divider networks with electrical conductivity cells 232 (320) and 233 (322), respectively. Cylindrical electrode 234 (324) of conductivity cell 232 (320) and cylindrical electrode 260(360) of conductivity cell 233 (322) are electrically common and connected to circuit ground. The height of the test liquid in the cell chambers 236 (332) and 262 (370) of electrical conductivity cells 232 (320) and 233 (322) determines the volume of test fluid in each cell. The electrical conductivity between the cylindrical electrode 234 (324) and pole electrode 246 (342) of cell 232 (320) and between cylindrical electrode 260 (360) and pole electrode 274 (380) of cell 233 (322) is a function of the volume of test fluid in the cells. The test liquid volume, and likewise the conductivity, will remain constant in cell chamber 262 (370) of conductivity cell 233 (322). This will keep signal output voltage 509 constant. The test liquid height in cell chamber 236 (332) of electrical conductivity cell 232 (320) will vary with the liquid height of test fluid 116 in the bottom of tank 100, thereby varying the volume of test fluid in the cell. This will produce a resultant change of electrical conductivity in cell 232 (320) and, thereby change the signal output voltage 507 measured across conductivity cell 232 (320) due to the voltage division ratio between resistor-1 503 and conductivity cell 232 (320).

Again, referring to FIGS. 6 and 7, when transducer 102 is lowered into storage tank 100 and equalization is completed, the two conductivity cells ideally are as shown in FIG. 6 generally at 600. Since test liquid levels in the conductivity cell with the closed bottom will not change with variations in the quantity of test liquid in the tank, this cell is the standard. To the contrary, since the test liquid level in the conductivity cell with the open bottom will change with variations in the quantity of test liquid, this cell is the measuring cell. When the conductivity of the standard cell and measuring cell are measured in the situation as depicted in FIG. 6, the measurements should be the same, which indicates that there is no leakage.

Turning to FIG. 7, the situation is depicted in which leakage has resulted and there is a lowering of the volume of test liquid 116 in the tank. When this happens, test liquid 116 is lowered in the measuring cell thereby decreasing the volume of test liquid in the cell. The decreased test liquid volume decreases the cell conductivity and changes the voltage division between resistor-1 503 and the measuring cell 232 (320) causing output signal 507 to change. This output signal change is compared in detector 502 to output signal 509 from the standard cell 233 (322) which has not changed and is an indication of and proportional to the leak. Moreover, since the two cells are disposed close together, both will be subjected to the same physical factors that could affect the accuracy of measurements. The signals output by the two cells are processed by the detection circuitry to provide an indication of the conditions within storage tank 100.

Figure 8:
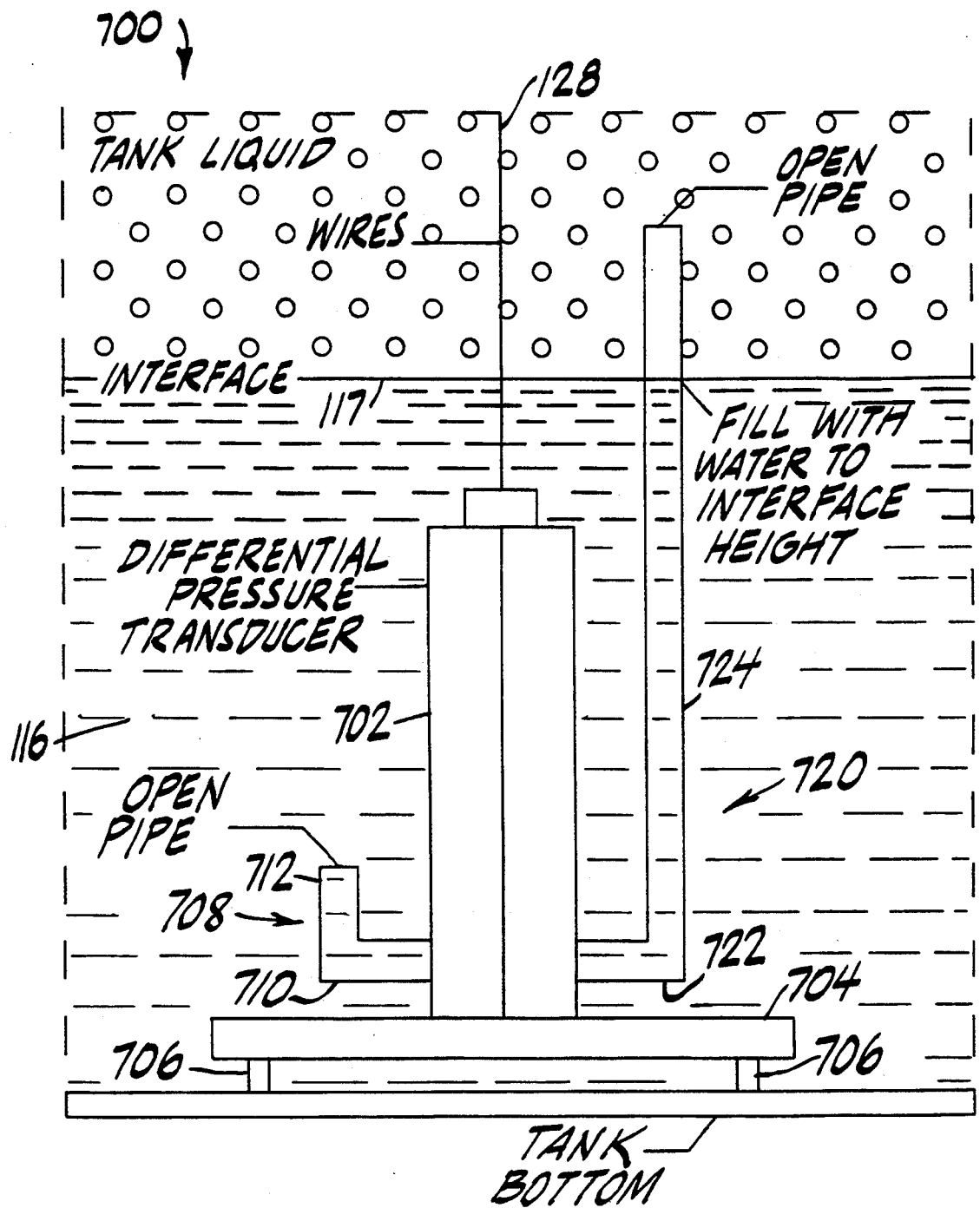
FIG. 8 is a cross-sectional view of a third embodiment of the transducer of the detection system to the present invention.

Referring to FIG. 8, the third embodiment of transducer 102 is shown generally at 700. The transducer at 700 includes differential pressure transducer 702 which is mounted on base 704. Base 704 has feet 706.

A first side of differential pressure transducer 702 is connected to L-shaped pipe 708. Pipe 708 has horizontal section 710 and vertical section 712. Horizontal section 710 extends from a lower portion of pressure transducer 702. Vertical section 712 extends upward only a short distance so that the open end of the pipe does not reach interface 117 between the tank liquid 114 and test liquid 116. A second side of differential pressure transducer 702 is connected to L-shaped pipe 720. Pipe 720 has horizontal section 722 and vertical section 724. Horizontal section 722 extends from the lower portion of transducer 702. Vertical section 724 extends upward such that it extends above interface 117 into tank liquid 114.

Before the differential pressure transducer at 700 is lowered into tank 100, pipe 720 is filled with a quantity of test liquid 116 such that, when the transducer at 700 is resting on bottom 108, the level of test liquid 116 in pipe 720 is substantially equal to the level of interface 117. Pipe 708 is completely filled with test liquid 116.

Figure 9:
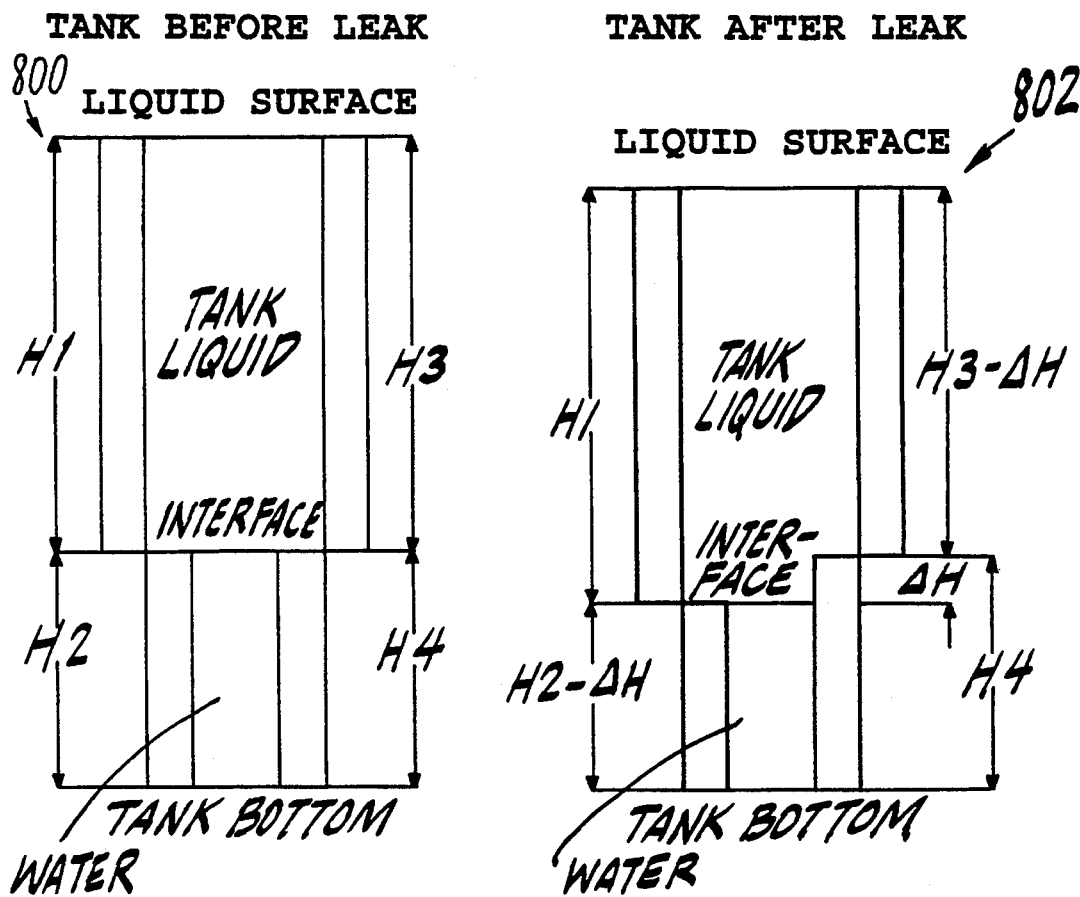
FIG. 9 shows the conditions before and after a leak occurs when the third embodiment of the transducer of detection system of the present invention is used.

Referring to FIG. 9 at 800, the situation is shown in which there has not been a leak when the differential pressure transducer at 700 (FIG. 8) is used, and in FIG. 9 at 802, the situation is shown in which there has been a leak. When a differential pressure transducer is used, the change in pressure between the two sides of the differential pressure sensor is determined by the expression:

$$(H1)(DTL)+(H2-\Delta H)(DW)-(H3-\Delta H)(DTL)-(H4)(DW)=\Delta P$$

DW = water or test liquid density.
DTL = tank liquid density.
H1 = initial height of tank liquid (measuring pipe side).
H2 = initial height of test liquid (measuring pipe side).
H3 = initial height of tank liquid (standard pipe side).
H4 = initial height of test liquid (standard pipe side).
$\Delta H$ = change in height of test liquid.
$\Delta P$ = differential pressure signal.

Referring to FIG. 10, a block diagram of the electronic device 104 used for the differential pressure transducer 702 is shown generally at 900. Pressure transducer 702 is electrically connected through cable assembly 128 to signal processor 902. The signal processor energizes pressure transducer 702 and also detects pressure transducer signal outputs. The electronic device may include signal processor 902, scaling device 504, display 506, recorder 508 and computer 510. It is understood that one or more of the components of electronic device 104 may be positioned at a location remote from the storage tank and still be within the scope of the present invention. All or any number of the components of electronic device 104 may be separate devices that are connected together to perform the function of electronic device 104.

Although the first and second embodiments have been described as including cylindrical walls that form electrodes, a person of ordinary skill in the art would understand that these electrode could have other shapes, for example, they could have been flat plates. In addition, the inner cylindrical chambers described could have other shapes, for example, they could have been open top boxes. Also a person of ordinary skill in the art would understand that various designs of circuits could be used as the electronic device.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A system for detecting a leak in a storage tank, the storage tank including a stored tank liquid and a test liquid, with the test liquid having a higher specific gravity than the tank liquid, and with an interface being formed between the tank liquid and the test liquid, the system comprising:

signal generator for generating signals for determining a level of the interface within the storage tank with respect to a predetermined level of the interface in the storage tank, the signal generator further comprising:

first measuring cell, which is disposed a predetermined distance from the bottom of the storage tank and extends across the interface such that a first portion of the first measuring cell is in the tank liquid and a second portion of the first measuring cell is in the test liquid, for generating a first signal indicative of a height of the interface in the first measuring cell, the first measuring cell including means for maintaining the interface at a predetermined height within the first measuring cell so that the height of the interface in the first measuring remains substantially the same when the height of the interface in the storage tank changes;

second measuring cell, which is disposed a predetermined distance from the bottom of the storage tank and extends across the interface such that a first portion of the second measuring cell is in the tank liquid and a second portion of the second measuring cell is in the test liquid, for generating a second signal indicative of a height of the interface in the second measuring cell, the second measuring cell including means for allowing a height of the interface within the second measuring cell to change with the height of the interface in the storage tank; and an electronic device coupled to a test system transducer for receiving and processing the first and second signals to generate at least a third signal indicative of a comparison of the first and second signals.

2. The system as recited in claim 1, wherein the first and second measuring cells are adjacently disposed, but spaced apart.

3. The system as recited in claim 1, wherein, when in an initial operative position, the first and second measuring cells are parallel to one another and extend an equal distance above and below the interface, so that physical factors affecting the tank liquid and test liquid affect both cells equally.

4. The system as recited in claim 1, wherein the first measuring cell has a closed bottom end for maintaining the height of the interface in the first measuring cell substantially the same when the height of the interface in the storage tank changes.

5. The system as recited in claim 1, wherein the second measuring cell has a open bottom end for allowing the height of the interface in the second measuring cell to change when the height of the interface in the storage tank changes.

6. The system as recited in claim 1, wherein the first measuring cell includes a first electrode and a spaced apart second electrode that are in an electrically conductive relationship based on the height of the interface within the first measuring cell.

7. The system as recited in claim 6, wherein the first electrode includes a pole electrode that is connected to a signal source.

8. The system as recited in claim 7, wherein the signal source includes an A.C. signal source.

9. The system as recited in claim 8, wherein the A.C. signal source includes an oscillator.

10. The system as recited in claim 7, wherein the signal source includes a D.C. signal source.

11. The system as recited in claim 6, wherein the second electrode includes a cylindrical electrode into which the first electrode is disposed, with the second electrode being connected to the electronic device.

12. The system as recited in claim 1, wherein the second measuring cell includes a first electrode and a spaced apart second electrode that are in an electrically conductive relationship based on the height of the interface within the first measuring cell.

13. The system as recited in claim 12, wherein the first electrode includes a pole electrode that is connected to a signal source.

14. The system as recited in claim 13, wherein the signal source includes an A.C. signal source.

15. The system as recited in claim 14, wherein the A.C. signal source includes an oscillator.

16. The system as recited in claim 13, wherein the signal source includes a D.C. signal source.

17. The system as recited in claim 12, wherein the second electrode includes a cylindrical electrode into which the first electrode is disposed, with the second electrode being connected to the electronic device.

18. The system as recited in claim 1, wherein the electronic device includes a detector for receiving and comparing the first and second signals.

19. The system as recited in claim 18, wherein the electronic device is a computer.

20. The system as recited in claim 18, wherein the electronic device includes a display for displaying information indicative of the signals output from the detector.

21. The system as recited in claim 18, wherein the electronic device includes a recorder for recording information indicative of the signals output from the detector.

22. A method of detecting a leak in a storage tank, the storage tank including a stored tank liquid and a test liquid, with an interface being formed between the tank liquid and the test liquid, the method comprising the steps of:
 (a) maintaining a height of the interface in a first measuring cell when changes in the height of the interface occur in the storage tank and generating a first signal based on the height of the interface in the first measuring cell;
 (b) changing a height of the interface in a second measuring cell when changes in the height of the interface occur in the storage tank and generating a second signal based on the height of the interface in the second measuring cell; and
 (c) comparing the first and second signals to determine if there is a difference in the signals indicative of a leakage condition in the storage tank.

* * * * *